United States Patent
Mössinger (10) Patent No.: US 12,311,297 B2
(45) Date of Patent: May 27, 2025

(54) IMPACTOR/SEPARATOR ELEMENT AND DEVICES COMPRISING AN IMPACTOR SEPARATOR/ELEMENT OF THIS TYPE

(71) Applicant: ELSÄSSER FILTERTECHNIK GMBH, Nufringen (DE)

(72) Inventor: Klaus Mössinger, Nufringen (DE)

(73) Assignee: ELSÄSSER FILTERTECHNIK GMBH, Nufringen (DE)

(*) Notice: Subject to any disclaimer, the term of this patent is extended or adjusted under 35 U.S.C. 154(b) by 193 days.

(21) Appl. No.: 17/799,405

(22) PCT Filed: Feb. 12, 2021

(86) PCT No.: PCT/EP2021/053554
§ 371 (c)(1),
(2) Date: Aug. 12, 2022

(87) PCT Pub. No.: WO2021/160862
PCT Pub. Date: Aug. 19, 2021

(65) Prior Publication Data
US 2023/0338881 A1    Oct. 26, 2023

(30) Foreign Application Priority Data
Feb. 13, 2020  (DE) .......................... 102020103804.6

(51) Int. Cl.
*B01D 45/08*  (2006.01)
*F01M 13/04*  (2006.01)

(52) U.S. Cl.
CPC ............. *B01D 45/08* (2013.01); *F01M 13/04* (2013.01)

(58) Field of Classification Search
CPC ........ B01D 53/78; B01D 45/16; B01D 45/00; B01D 45/18; B01D 46/0005;
(Continued)

(56) References Cited

U.S. PATENT DOCUMENTS 2,205,336 A * 6/1940 Beach ................ B01D 17/0211
                                                    96/191
3,546,854 A * 12/1970 Muller .................... B01D 47/00
                                                    55/455
(Continued)

FOREIGN PATENT DOCUMENTS

CN    102159803 A  *  8/2011   ......... B01D 46/0005
CN    106039876 A  * 10/2016   ............. B01D 45/12
(Continued)

OTHER PUBLICATIONS

DE 102015111247 English Translation (Year: 2017).*
International Search Report and Written Opinion for PCT/EP2021/053554, filed Feb. 12, 2021. pp. 1-15.

*Primary Examiner* — George C Jin
*Assistant Examiner* — Teuta B Holbrook
(74) *Attorney, Agent, or Firm* — David L. Nocilly; Bond Schoeneck & King PLLC (57) ABSTRACT

The invention is based on an impactor-separator element (10) for separating fluid droplets (12) from a gas stream, comprising at least one separator means (14a, 14b) having a raw side and a clean side, said separator means (14a, 14b) being designed as a mesh or grid element and being fixed in a holder (16), wherein the holder (16) is designed to position the separator means (14a, 14b) with a shallow angle of attack in the gas stream.

It is proposed to provide at least one element (36, 46) arranged in the gas flow upstream of the separation means (14a) for controlling the gas flow impinging on the separation means.

16 Claims, 12 Drawing Sheets

(58) Field of Classification Search
CPC .. B01D 46/001; B01D 69/1071; B01D 69/10; B01D 71/00; B01D 71/02; B01D 71/06; B01D 17/0211; B01D 17/00; B01D 17/02; B01D 39/00; F01M 13/04; F01M 13/00; F01M 13/02; F01M 13/0405; F01M 13/0416; F01M 2013/0433; F01M 2013/0438; F01M 2013/045; F01M 2013/0461; F01M 2013/0477
USPC ......... 55/471, 490, 492, 521, 513, 516, 434, 55/431, 460, 457, 456, 503, 463; 95/267; 96/58, 66, 189, 300
See application file for complete search history.

(56) References Cited

U.S. PATENT DOCUMENTS

| | | | | |
|---|---|---|---|---|
| 4,198,726 A | * | 4/1980 | Powell, Jr. | D01H 11/006 55/501 |
| 5,409,514 A | * | 4/1995 | Ragusa | B01D 46/0043 55/319 |
| 6,080,228 A | * | 6/2000 | Okada | B01D 50/20 55/413 |
| 6,083,291 A | * | 7/2000 | Okada | B01D 45/12 55/455 |
| 8,876,930 B2 | * | 11/2014 | Pavlatos | B01D 45/14 55/306 |
| 2003/0089233 A1 | * | 5/2003 | Borla | B01D 46/2403 55/498 |
| 2009/0193770 A1 | | 8/2009 | Holzman et al. | |
| 2010/0101425 A1 | * | 4/2010 | Herman | F01M 13/0011 55/447 |
| 2014/0059985 A1 | * | 3/2014 | Janakiraman | B01D 45/16 55/459.4 |

FOREIGN PATENT DOCUMENTS

| | | | | |
|---|---|---|---|---|
| CN | 108194166 A | * | 6/2018 | ............ F01M 13/04 |
| CN | 109681289 A | * | 4/2019 | ............ F01M 13/04 |
| DE | 202015101076 U1 | | 3/2015 | |
| DE | 102015111247 A1 | * | 1/2017 | |
| EP | 1426091 A1 | | 6/2004 | |
| KR | 20100052770 A | * | 5/2010 | |
| KR | 101587599 B1 | * | 2/2016 | |
| WO | 2018036939 A1 | | 3/2018 | |

* cited by examiner

IMPACTOR/SEPARATOR ELEMENT AND DEVICES COMPRISING AN IMPACTOR SEPARATOR/ELEMENT OF THIS TYPE

CROSS-REFERENCE TO RELATED APPLICATIONS

The present application is a US national stage phase of International Application No. PCT/EP2021/053554, filed on Feb. 12, 2021, which claims priority to German Patent Application DE 10 2020 103 804.6, filed on Feb. 13, 2020.

The invention relates to impactor-separator element for separating fluid droplets from a gas stream according to the preamble of claim 1.

From WO 2018036939 A1 a separation system for cleaning a raw gas stream in a side channel compressor is known. The separation system comprises a separator element, which is arranged within the flow channel and through which a gas flow can flow for separating impurities.

The separator element known from WO 2018036939 A1 is arranged in a flow channel and a side wall of the flow channel directly adjoining the separator element forms an acute angle with the latter on the clean side of the separator element. Therefore, the gas cannot flow off freely at least in this partial area, which impairs the efficiency of the separator system.

The invention is based on the problem of further increasing the efficiency of a generic separator system.

The problem is solved by an impactor-separator element having the features of claim 1. Advantageous embodiments of the invention are disclosed in the dependent claims.

The invention relates to an impactor-separator element for separating fluid droplets from a gas stream, comprising at least one separator means in the form of a mesh or grid element fixed in a holder, the holder being designed to position the separator means in the gas stream with a shallow angle of attack.

It is proposed that the impactor-separator element comprises at least one element arranged in the gas flow ahead of the separator means for controlling the gas flow impinging on the separator means.

Since the efficiency of the impactor-separator element depends decisively on the angle of incidence and on the flow velocity of the gas flowing in, the efficiency of the impactor-separator element can be significantly improved by such elements.

Moreover, it is proposed that the holder is designed to position the separator means in the gas flow in such a way that the gas can flow off freely on the clean side of the separator means.

A generic separator in the form of a mesh or grid element with a flat inflow direction has proven to be very efficient. Its effect is essentially based on the fact that the gas flow is strongly deflected over a short distance of the order of magnitude of the diameter of the passage opening when flowing through the usually very small passage openings, in order to run essentially transversely to the main plane of the separator element within the thickness of the separator element. With a flat inflow angle, the angle of this deflection is approximately 90°. The gas flow is therefore very strongly accelerated transversely, so that fluid droplets or aerosols deposit on the walls or edges of the passage openings, combine to form larger droplets and are possibly carried along in this form by the gas flow in order to be separated at another point.

This effect depends in particular on the aspect ratio of the openings, i.e. on a ratio of a diameter or width of the openings in the direction of incident flow to a depth of the openings or a thickness of the separator element, whereby in the case of nets or fabrics the thickness of the threads can be put in relation to the mesh width. A shallow angle of attack in the sense of the invention means that the width of the openings multiplied by the sine of the angle of attack should be smaller than the depth of the openings or the thickness of the threads, preferably smaller by a factor of 1.5-10, more preferably smaller by a factor of 2-8. In particular, a shallow angle of attack is less than 20°. A plane in which the at least one separator means extends preferably includes an angle of at most 40°, in particular at most 20°, preferably at most 10°, and/or at least 3°, in particular at least 5°, preferably about 8°, with a main direction of the gas flow channel in the region of the separator means.

The separator element according to the invention is preferably a woven fabric with a mesh size in the range of 20-300 µm, more preferably in the range of 30-80 µm, depending on the aerosol spectrum to be separated and the maximum acceptable pressure drop. It has been shown that for such separation media a high degree of separation can be achieved even for very small aerosols at comparatively low pressure loss. The thickness of the threads of the fabric is preferably 20-100 µm, in particular 30-80 µm.

A gas stream can flow off freely in the sense of the invention if no appreciable pressure gradients occur over the surface of the separating medium on the clean side, at least not due to the proximity to walls or other obstacles, and the flow through the separating medium is essentially homogeneous. Depending on the embodiment of the invention, the holder may be a frame, a base or part of a housing.

It is further proposed that the holder is adapted to mount the separator means in a housing, and that the holder comprises a spacer structure that ensures a minimum distance of at least 2 mm from the housing wall. In this way, a free outflow can be ensured in most cases.

The minimum distance can be ensured in a structurally particularly easy manner if the spacer structure comprises a base for insertion into a housing opening, the gas inlet being integrated into the base.

In a particularly preferred embodiment of the invention, the impactor-separator element comprises at least two separator means arranged symmetrically with respect to a main flow axis of the gas flow, which may for example form the side faces of a triangular prism or tent-like structure.

It is further proposed that the impactor-separator element comprises at least one flow directing element arranged in the gas stream ahead of the separator means, which directs the gas stream with a shallow angle of attack to the separator means. In this way, the local angle of attack at the separator means can be controlled in such a way that an optimum value is achieved.

In a particularly advantageous embodiment of the invention, it is proposed that the flow directing element is displaceable against a restoring force by the pressure of the gas stream, shields a partial area of the separator means in at least one configuration, and is configured such that a larger area of the separator means is exposed with increasing displacement. The effectively active area of the separator means is thus adjusted as a function of the volume flow, so that a local flow velocity in the area of the separator means is independent of or only weakly dependent on the volume flow, i.e. the total volume of the gas flow passing through the impactor-separator element.

In a further embodiment of the invention, it is proposed that the element comprises an adjustable element for varying a flow cross-section of the gas stream. In advantageous embodiments of the invention, the element is arranged so close to the separator means that an increased flow velocity associated with a reduced flow cross-section leads to an increased impact velocity of the fluid droplets on the separating means, in particular at a distance of less than 10 cm, advantageously less than 5 cm, particularly advantageously less than 5 cm, from an upstream end of the separating means.

In a particularly advantageous embodiment of the invention, it is proposed that the separator means is arranged parallel to a main flow axis of the gas stream. In particular, the separator means can then be arranged in the form of a cylinder jacket or in the form of jacket surfaces of a prism on a holder, which enables a compact and structurally simple design.

Another aspect of the invention relates to an apparatus comprising a housing and an impactor-separator element arranged at a gas inlet of the housing, according to any one of the preceding claims.

In particular, it is proposed that a distance of an inner housing wall from the clean side of the separator means is such as to ensure a free outflow of the gas stream exiting the separator means. To characterize the free outflow, the aforementioned distance is preferably measured in the outflow direction of the gas stream, i.e. perpendicular to the main side of the separator means.

In a preferred embodiment of the invention, an angle between a wall region of the housing or the holder adjoining the foot region of the separator, i.e. the clean side of the end edge of the separator facing the gas stream, is at least 60°, more preferably at least 80°, in particular more than 90°.

In particular, it is suggested that a distance between the inner wall of the housing and the clean side of the separator means in a direction perpendicular to a main plane of the separator means is at least 2 mm, preferably at least 5 mm, in substantially every point of the separator means.

According to a further embodiment of the invention, it is proposed that the housing is configured such that the gas flow is deflected after passing through the impactor-separator element to separate fluid droplets deposited by the separator element on a housing wall. In this way, fluid droplets separated by the impactor-separator element, which are much larger than the fluid droplets of the incoming gas stream, can be efficiently separated.

In an advantageous embodiment, the device according to the invention can be designed as a separator element in an internal combustion engine, e.g. in combination with a side channel compressor for an internal combustion engine, or alternatively in combination with an ejector or a diffuser or a blower to compensate for the pressure loss of the impactor-separator element.

In a further embodiment, the invention can be designed for separating coolant-lubricant droplets in an extraction device of a machine tool, in which case several impactor-separator elements according to the invention can operate in parallel, for example in a matrix arrangement, in order to be able to process the large volume flows occurring in this context.

In the variant in which the element comprises an adjustable element for varying a flow cross-section of the gas flow, it is further proposed that the housing comprises a pressure regulating mechanism adapted to reduce the flow cross-section with increasing pressure difference between gas inlet and a gas outlet. In particular, the pressure regulating mechanism may comprise a pressure chamber with a diaphragm, the element being mechanically coupled to the diaphragm so that movement of the diaphragm results in a change in the flow cross-section.

Further features and advantages will be apparent from the following figure description. The entire description, the claims and the figures disclose features of the invention in specific embodiments and combinations. The person skilled in the art will also consider the features individually and combine them into further combinations or sub-combinations to adapt the invention, as defined in the claims, to his needs or to specific fields of application.

Figure 1:
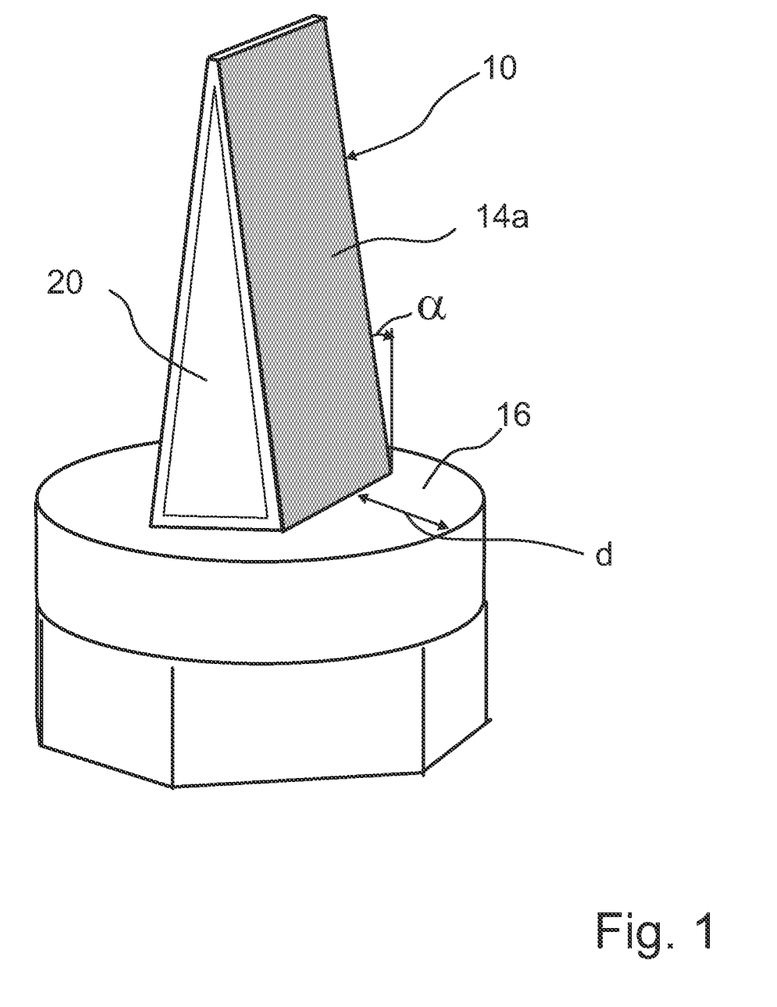
FIG. 1 an impactor-separator element according to a first embodiment of the invention.

The following is shown:

FIG. 1 illustrates an impactor-separator element 10 for separating fluid droplets 12 from a gas stream according to a first embodiment of the invention.

The impactor-separator element 10 comprises two separator means 14a, 14b, each having a raw side and a clean side, which are fastened in a holder 16 and are designed as a mesh or grid element, the holder 16 positioning the two separator means 14a, 14b in the gas stream with a flat inflow angle of approximately 8°, respectively. The two separator means 14a, 14b are arranged symmetrically with respect to a main flow axis 18 of the gas flow, forming the side surfaces of a triangular prism or tent-like structure.

According to the invention, the holder 16 is adapted to position the two separator means 14a, 14b in the gas flow in such a way that the gas can flow off freely on the clean side of the two separator means 14a, 14b.

In the embodiment shown in FIG. 1, the holding device 16 is designed as a base on which a tent-like support frame 20 is arranged for supporting the separator means 14a, 14b. The separator means 14a, 14b are fine mesh fabrics made of polyester with a thread thickness of 30-80 μm and a width also in a range of 30-80 μm, which are glued or welded to the outer surfaces of supporting frames of the support frame 20. In particular at the downstream end of the separator means 14a, 14b, the support frames do not form any frame structures projecting beyond the downstream side or clean side of the separator means 14a, 14b, so that fluid droplets cannot accumulate there and can drip off unhindered at the rear end of the support frame 20. In this context, "rear end" means the end downstream with respect to the gas flow, and "front end" means the end facing the gas flow.

Figure 2:
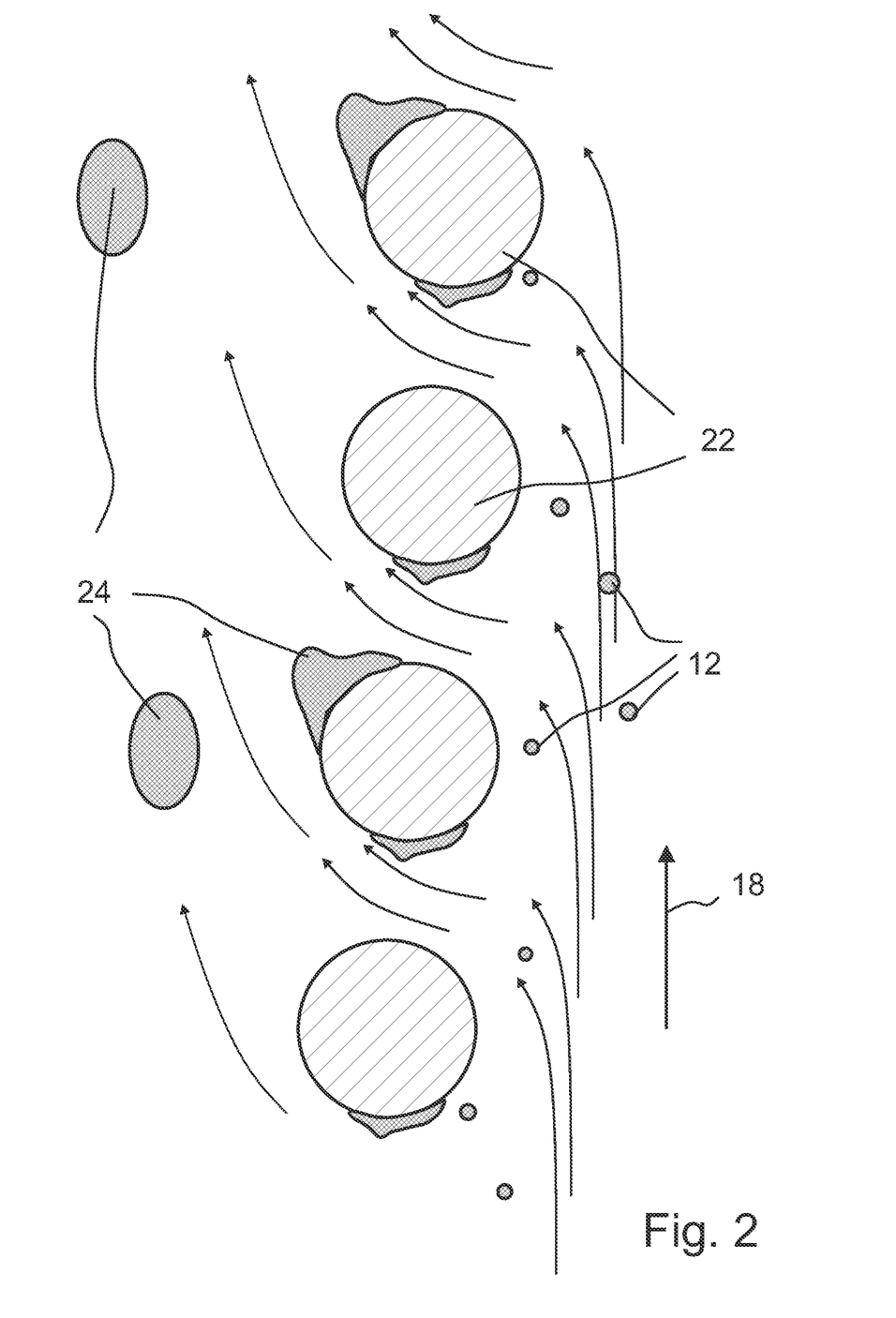
FIG. 2 a schematic representation for the mode of action of the impactor-separator element on a microscopic skala.

FIG. 2 is a schematic diagram showing the operation of the impactor separator element 10 on a microscopic scale. The gas flowing in at a shallow angle and loaded with fluid droplets 12 is directed through the meshes of the separator 14a. The meshes act like a narrow chicane. In the process, the gas flow is locally strongly accelerated in the transverse direction. The droplets or other impurities, which have a higher inertia than the gas molecules due to their mass, beat off on the threads or wires 22 of the mesh forming the separator means 14a and collect to form larger droplets 24 or a fluid film. The droplets 24 may be convected in the gas stream on the clean side of the separator means 14a, 14b, or may flow down the warp threads of the fabric (i.e., the threads running substantially parallel to the direction of the incoming gas) to the downstream end of the separator means 14a, 14b, where they drip off or are otherwise discharged.

Figure 3:
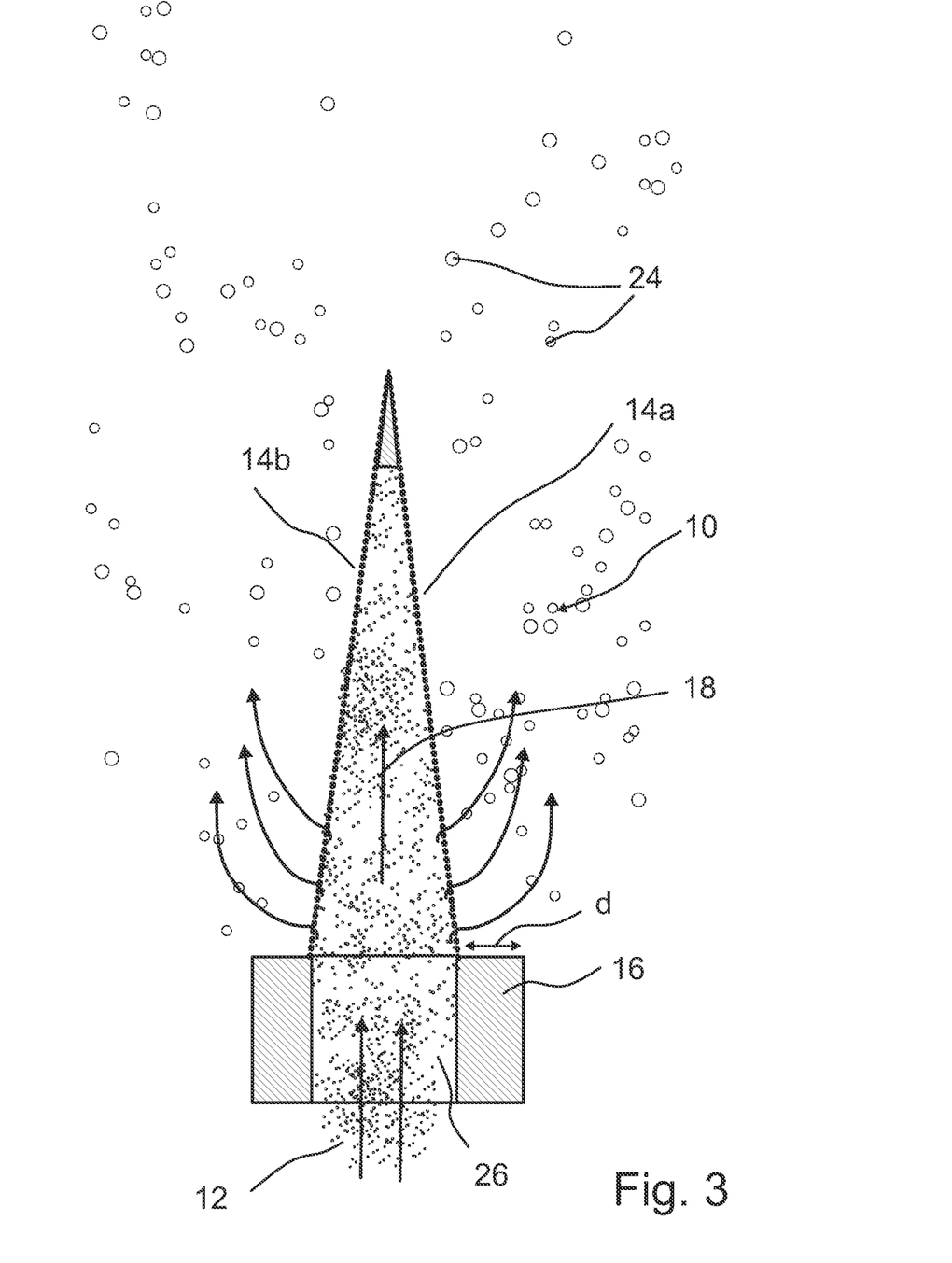
FIG. 3 a further illustration showing the mode of action of the impactor-separator element.

FIG. 3 shows a further illustration of the mode of operation of the impactor separator element 10 of FIG. 1. The base 16 comprises an inlet opening 26 for the gas flow, which divides symmetrically and flows through the two separator means 14a, 14b. The width d of the base ensures a corresponding minimum distance to a housing wall in the installation situation and thus a free outflow. The width d of the base at the foot of the separator means 14a, 14b is at least 2 mm, preferably at least 5 mm, still more preferably at least 10 mm, and preferably over the entire width of the separator means 14a, 14b, the distance being greater in the central region in the case of a round base and a rectilinear foot edge. On the clean side of the separator means 14a, 14b, larger droplets 24 can be convected by the gas flow and separated downstream.

Figure 4:
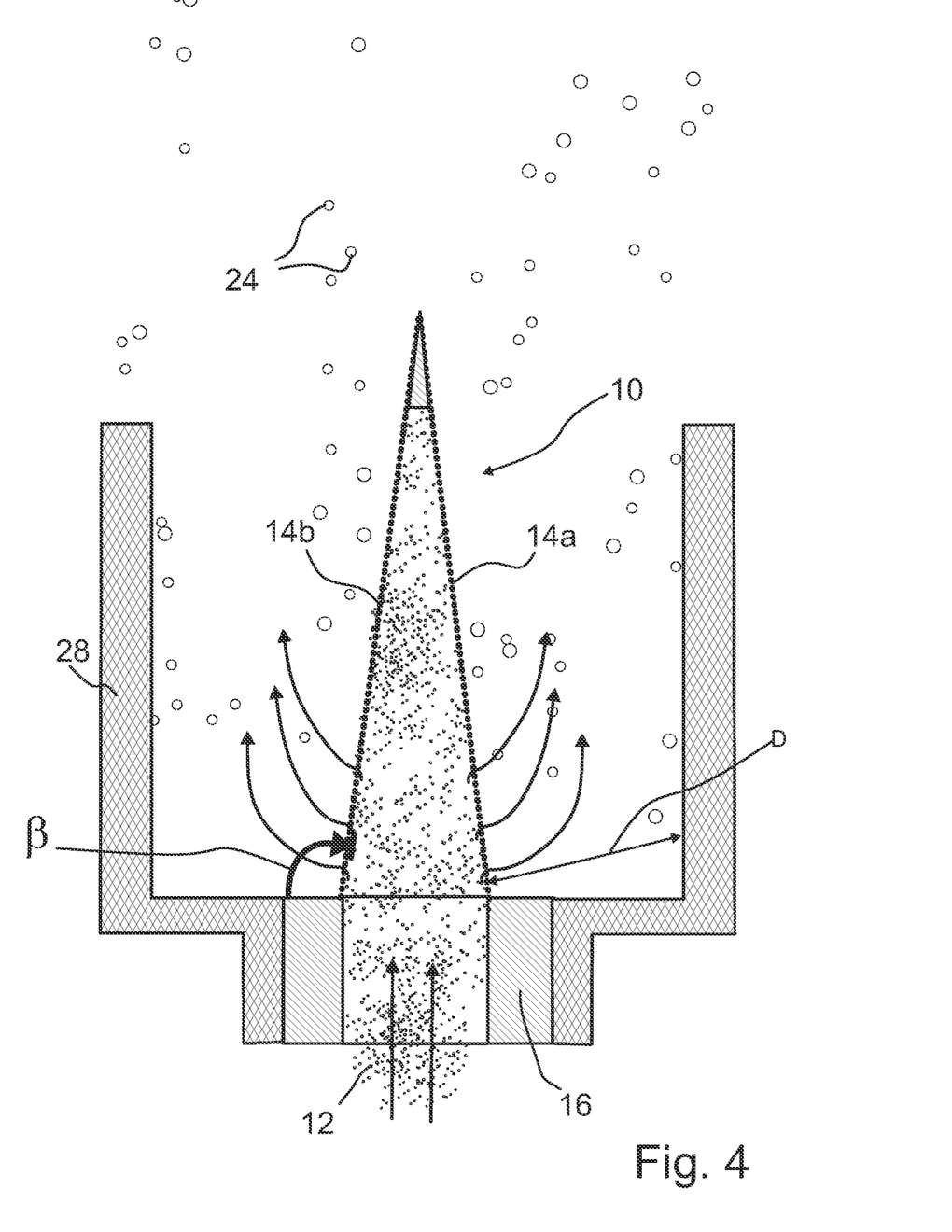
FIG. 4 a first device with a housing and an impactor-separator element according to FIGS. 1-3.

FIG. 4 shows a device with a housing 28 and an impactor separation element 10 of the aforementioned type arranged at a gas inlet 30 of the housing 28. The holder 16 is mounted in an opening at the gas inlet 30 and positions the two separator means 14a, 14b of the impactor separator element 10 with the desired shallow angle of approach in the housing 28. The base of the holder 16 forms a spacer structure which ensures a minimum distance of at least 2 mm between the separator means 14a, 14b and the housing wall. In the example shown in FIG. 5, the inner housing wall continuously extends along side of the base facing the separator means 14a, 14b and acts as an additional spacer, so that a distance D between the separator means 14a, 14b and the side walls running vertically in FIG. 4, measured in a plane perpendicular to the main plane of the separator means 14a, 14b, is even greater. This ensures a free outflow of the gas stream emerging from the separator means 14a, 14b.

A wall area of the base adjacent to the foot area of the separator 14a, 14b forms an obtuse angle β with the main plane of the separator 14a, 14b, in the example an angle of 98°.

Figure 5:
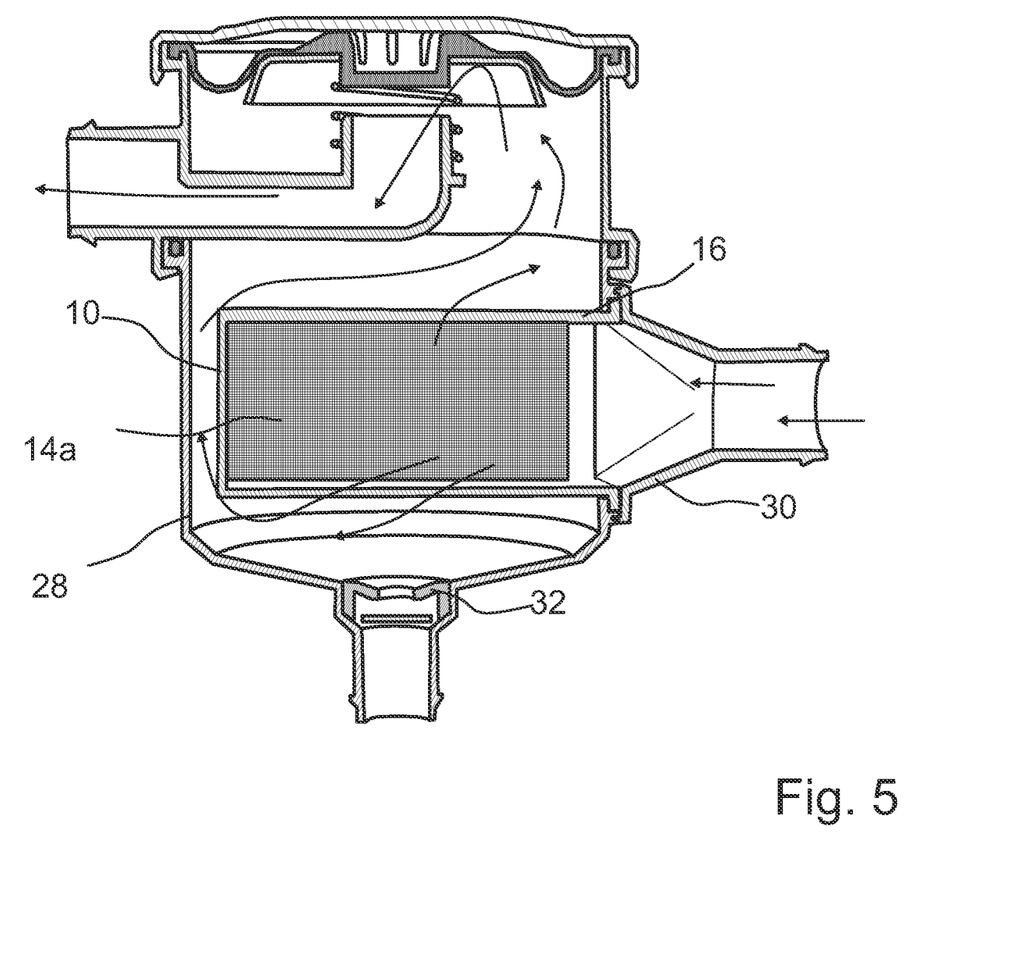
FIG. 5 an oil droplet separation device for use with a side channel compressor.

FIG. 5 schematically shows a device according to the invention designed for an internal combustion engine. The pressure loss resulting from the through-flow can be compensated by a blower, in particular by a side channel compressor or by an ejector or a diffuser. At the gas inlet 30, air loaded with oil droplets flows in from a crankcase of the internal combustion engine (not shown), which is to be returned to the intake tract (not shown) of the internal combustion engine, for example after an air filter and before a turbocharger, after the oil droplets have been separated. In this embodiment of the invention, the housing 28 is configured such that the gas flow is deflected within the housing 28 after passing through the impactor-separator element to deposit fluid droplets 24 separated by the separator element 10 on a housing wall. A valve 32 is disposed in the bottom of the housing 28 through which the oil can be returned to the oil sump of the engine, possibly via a siphon.

In a further embodiment, the invention can be designed for separating coolant-lubricant droplets in an extraction device of a machine tool, in which case several impactor-separator elements according to the invention can operate in parallel, for example in a matrix arrangement, in order to be able to process the large volume flows.

Figure 6:
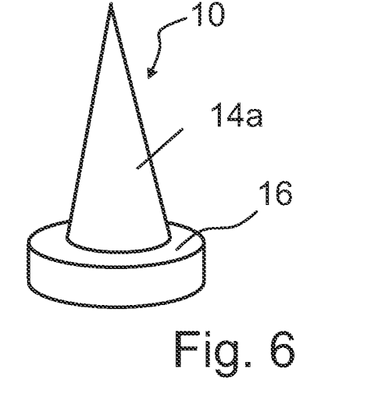
FIG. 6 an impactor-separator element according to a second embodiment of the invention.
Figure 7:
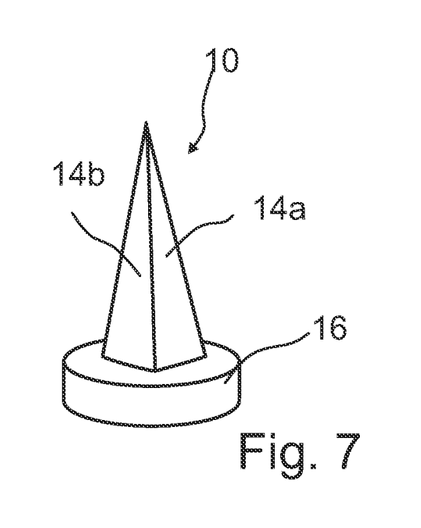
FIG. 7 an impactor-separator element according to a third embodiment of the invention.
Figure 8:
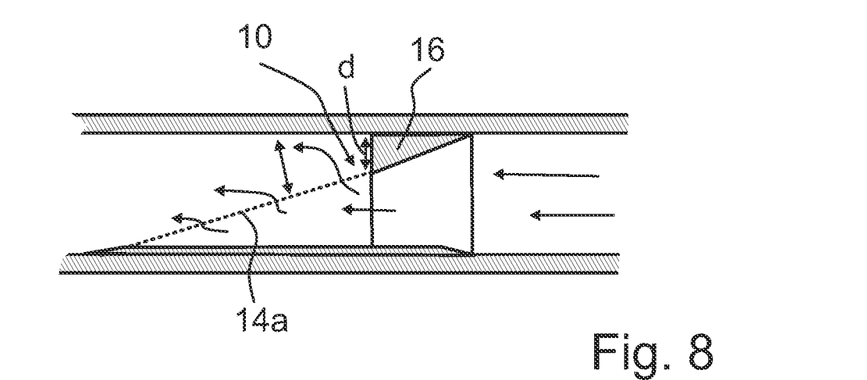
FIG. 8 an impactor-separator element according to a fourth embodiment of the invention.

FIGS. 6 to 8 show further embodiments of the invention. In order to avoid repetition, the following description of these further embodiments is essentially limited to differences from the first embodiment of the invention. Regarding the unchanged features, the skilled person is referred to the description for the first embodiment. The same reference signs are used for features of the other embodiments that have the same or similar effect in order to emphasize the similarities.

FIG. 6 shows an impactor-separator element 10 according to a second embodiment of the invention with a single, cone-jacketed positioned separator means 14a.

FIG. 7 shows an impactor-separator element 10 according to a third embodiment of the invention with four triangular separator means 14a, 14b forming the side faces of a pyramid with a square base. Other polygon shapes such as hexagonal pyramids are conceivable.

FIG. 8 shows an impactor-separator element 10 according to a fourth embodiment of the invention. The impactor-separator element 10 comprises a single separator means 14a, which can be arranged in a pipeline 34. A holder 16 ensures, at least in a central region of the separator means 14a, 14b, a distance to the inner wall of the pipeline 34 and thus a substantially free outflow on the clean side.

Figure 9:
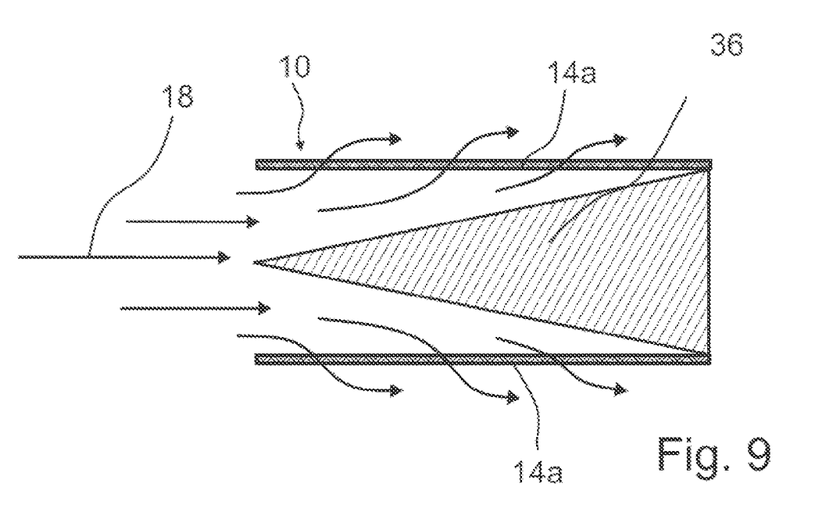
FIG. 9 an impactor-separator element according to a fifth embodiment of the invention.
Figure 10:
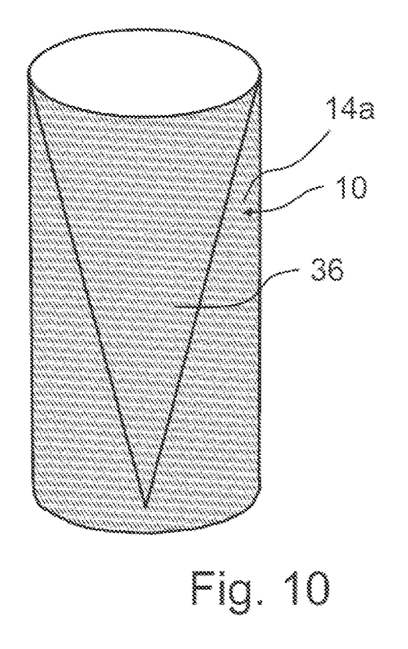
FIG. 10 a perspective view of the impactor-separator element of FIG. 9.

FIG. 9 and FIG. 10 show an impactor-separator element 10 according to a fifth embodiment of the invention. The impactor-separator element 10 comprises a single, cylinder-jacket-shaped separator means 14a, inside which a cone-shaped flow-guiding element 36 is coaxially arranged. If the fabric used for the separator means 14a is not sufficiently stiff, the cylindrical surface of the separator means 14a may be interrupted by axially extending stiffening ribs (not shown).

A cone base of the flow directing element 36 is connected, e.g. glued, to the downstream edge of the separator means 14a. A central axis of the cylinder-jacket-shaped separator means 14a and also the separator means 14a itself run parallel to the main flow axis 18 the tip of the cone-shaped flow-guiding element 36 faces the gas flow in the direction of the main flow axis 18.

The incoming gas flow is deflected radially outwardly by the flow directing element 36 so that it strikes the separator means 14a with a shallow angle of approach, flows through the separator means 14a, and is free to flow off the radially outer side of the separator means 14a.

The impactor-separator element 10 according to the embodiment in FIGS. 9 and 10 can be arranged with the open left end in FIG. 9 at the outlet of a flow channel (not shown), e.g. within a housing. For this purpose, a suitable base, flange or suitable fastening elements can be provided at the left end (not shown).

Figure 11:
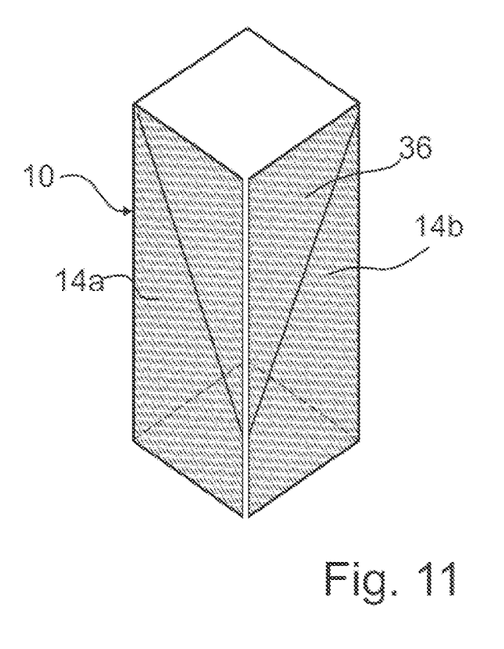
FIG. 11 an impactor-separator element according to a sixth embodiment of the invention.

In addition to the cylinder-jacket-shaped form of the separator means 14a according to the fifth embodiment, embodiments are also conceivable in which separator means form the side surfaces of a prism whose base surface forms a base surface of a pyramid which is arranged centrally in the prism and acts as a flow deflector element 36. Also in this case, the separator means 14a, 14b are arranged in planes parallel to the main flow axis 18. A sixth embodiment with an impactor-separator element 10 having separator means 14a, 14b arranged in the shape of a prism with a square base is shown in FIG. 11. In addition to square base surfaces, other polygonal shapes are of course conceivable.

In the embodiments from FIGS. 9-11, the side surface of the flow guiding element 36 runs in a straight line in an axial section (FIG. 9). Other shapes are also conceivable for flow optimization. The rear side of the flow guiding element 36 facing away from the flow is flat in the embodiments from FIGS. 9-11. Convex shapes of this end face are also conceivable, for example with conically tapering cross-sections, which avoid turbulence of the outflowing gas or control it in a targeted manner.

Figure 12:
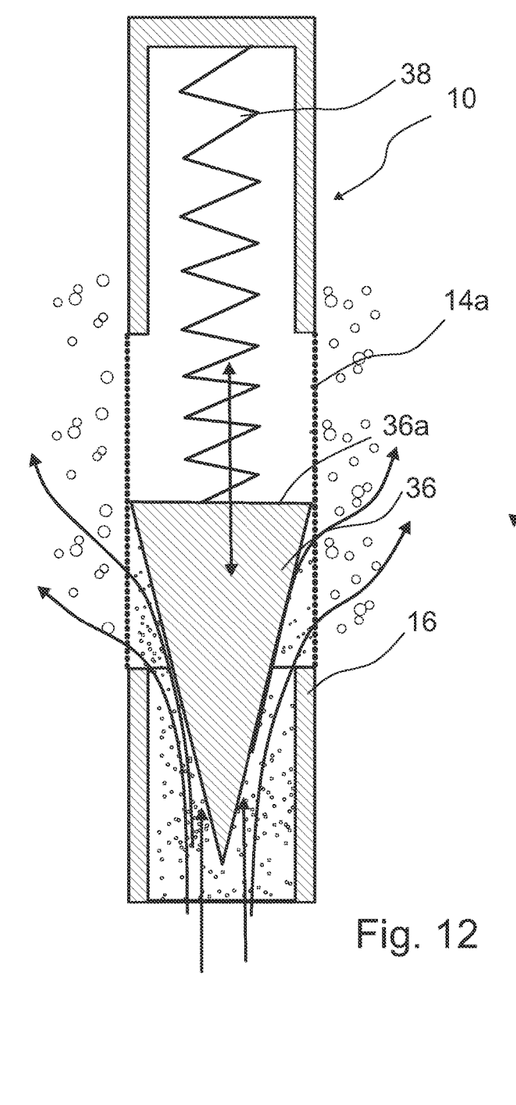
FIG. 12 an impactor-separator element according to a seventh embodiment of the invention in a low volume flow configuration.
Figure 13:
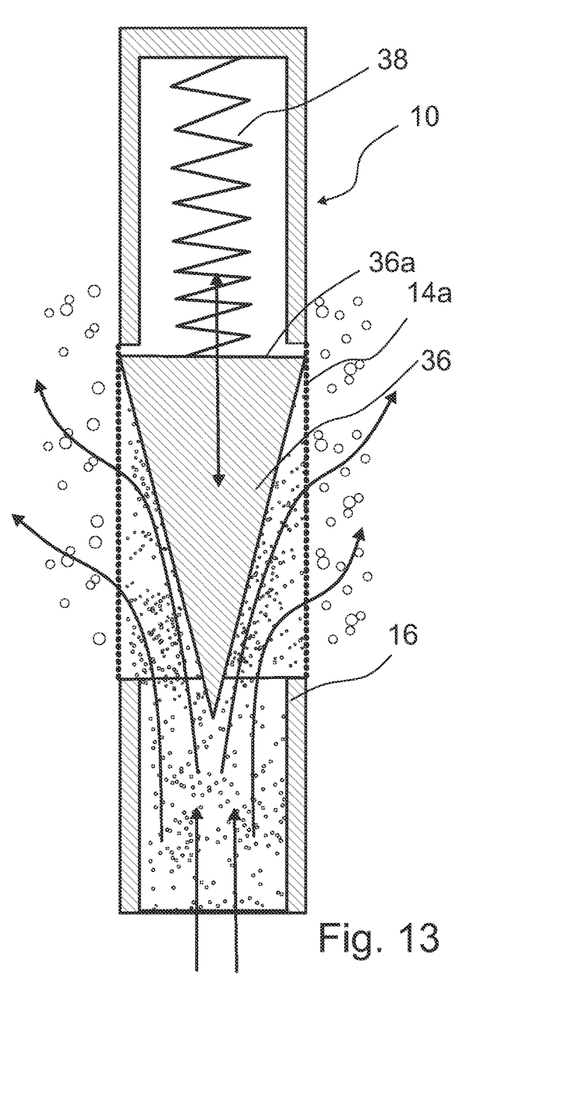
FIG. 13 the impactor-separator element according to the seventh embodiment of the invention in a high volume flow configuration.

FIG. 12 shows an impactor-separator element according to a seventh embodiment of the invention in a configuration with low volume flow, and FIG. 13 shows the impactor-separator element according to the seventh embodiment of the invention in a configuration with high volume flow.

The impactor-separator element according to the seventh embodiment comprises a cylinder-jacket-shaped separator means 14a, configured as a mesh, fabric or grid element, which forms an axial portion of a generally tubular holder 16. A conical flow guide element 36 is arranged in the interior of the holder 16 and is axially movable in the interior of the holder 16. Against the restoring force of a spring 38, the flow directing element 36 can be displaced between a basic position, in which a base surface 36a of the conical shape of the flow directing element 36 lies close to the upstream end of the separator means 14a, and a maximum deflected position, in which the base surface 36a of the conical shape of the flow directing element 36 lies close to the downstream end of the separator means 14a.

Due to the conical shape of the flow directing element 36, the inflowing gas is directed radially outward and flows through the separator means 14a with a shallow inflow angle. The base surface 36a of the conical shape of the flow guiding element 36 thereby defines an axial region of the separator means 14a through which the gas flow can pass, while a region of the separator means 14a downstream of the base surface 36a is shielded from the gas flow by the flow guiding element 36. The area of the separator means 14a through which the gas flow passes therefore depends on the axial position of the flow directing element 36 and thus on the volumetric flow entering the impactor-separator element 10, in such a way that the area of the separator means 14a through which the gas flow passes increases with increasing volumetric flow and consequently increasing compression of the spring 38, in a substantially linear manner, so that the area of the separator means 14a through which the gas flow passes is substantially proportional to the volumetric flow. As a result, the local flow velocity of the gas flow at the separator means 14a is substantially constant and independent or only weakly dependent on the volume flow.

It is known that impactor-separator elements 10 of the type according to the invention with a shallow angle of attack of the separator means 14a have a high efficiency in a certain preferred range of flow velocities, in particular above a minimum flow velocity, depending on the type of the mesh or grid element. In this embodiment, the elastic force of the spring 38 can be adjusted so that the local flow velocity is within the preferred range of flow velocities for a very wide range of velocities of the main flow.

Figure 14:
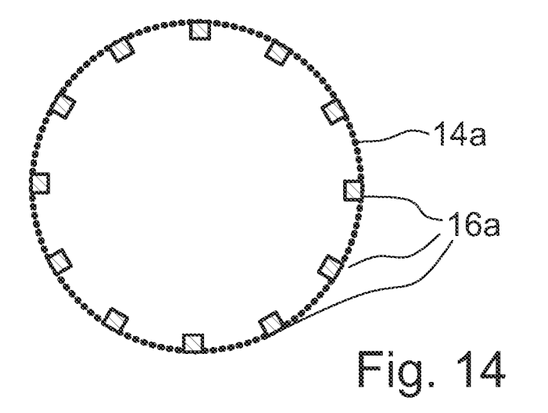
FIG. 14 the impactor-separator element according to the seventh embodiment of the invention in radial sectional view, FIG. 15 an impactor separator element according to an eighth embodiment of the invention.

FIG. 14 shows the impactor-separator element 10 according to the seventh embodiment of the invention in radial sectional view. The separator means 14a, which is configured as a mesh, is held by a series of holders 16a that also connect a downstream portion of the support 16, which forms a cavity with the base 36a of the flow directing element 36 to receive the spring 38, to a base portion of the support 16. The flow directing element 36 may include axial grooves (not shown) in the base area 36a, in which the supports 16a engage to guide the flow directing element 36.

Although in FIGS. 12 and 13 the flow directing element 36 appears as a solid body, the flow directing element 36 may be configured as a hollow body having an opening in the base surface 36a into which the spring 38 may then be partially received.

Figure 15:
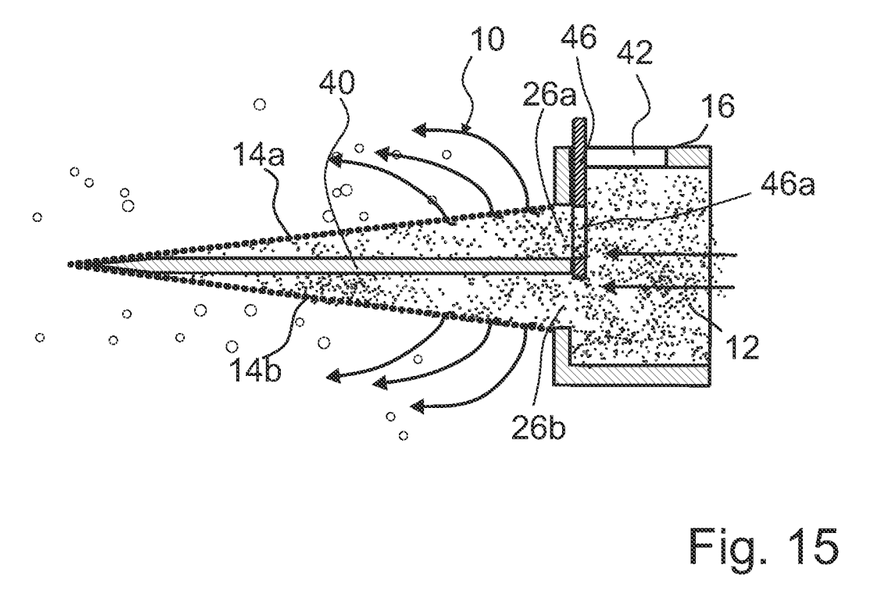

FIG. 15 shows an impactor separator element 10 according to an eighth embodiment of the invention. The impactor separator element 10 of FIG. 15 differs from the impactor separator element of FIGS. 1 and 3, respectively, in particular by a narrower holder 16, by an opening 42 on one side of the holder 16, the function of which will be described in connection with FIGS. 16-19, and by a center wall 40, by which the partial streams flowing through both separator means 14a, 14b are separated from each other in order to avoid interference and reduce turbulence.

Figure 16:
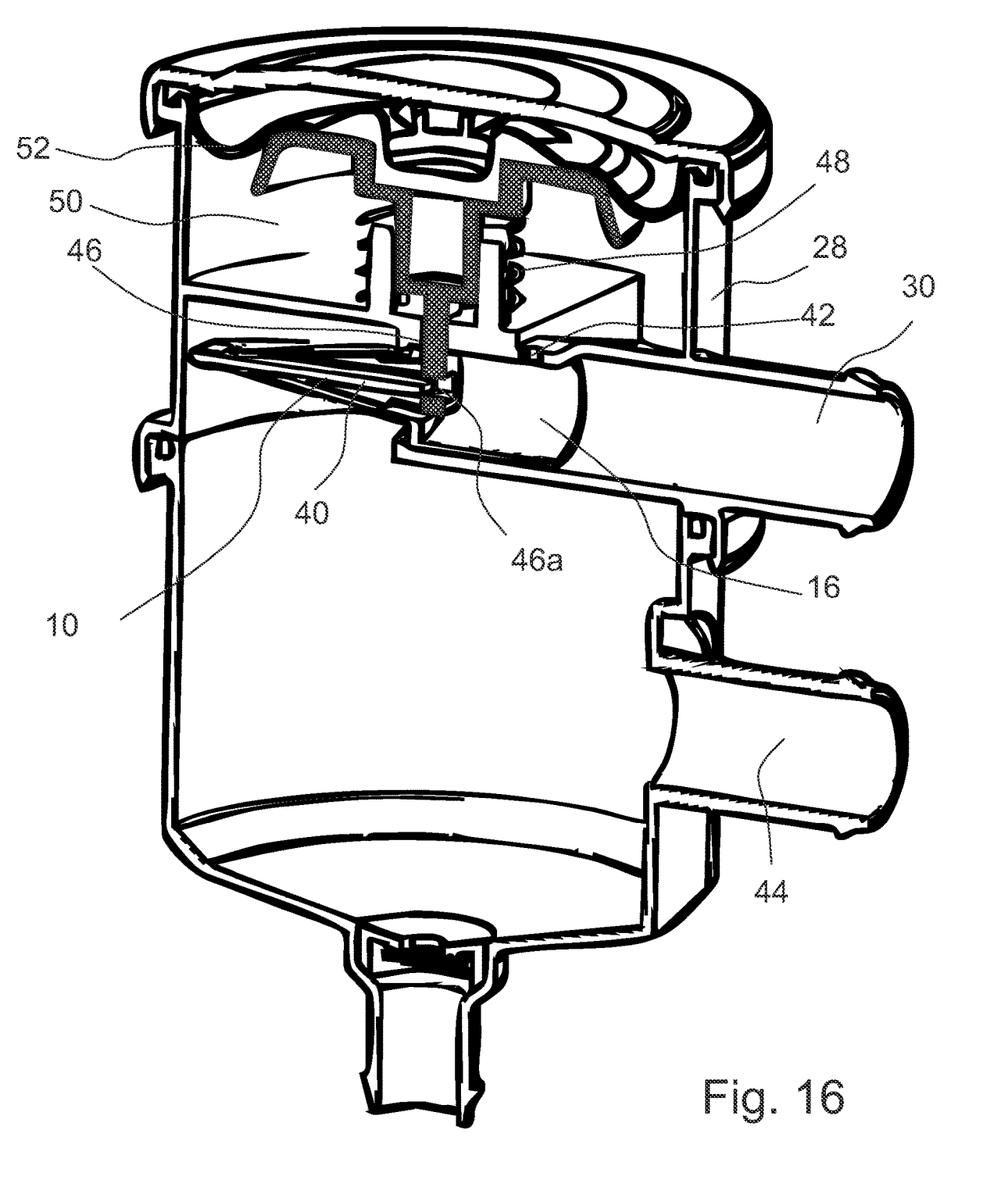
FIG. 16 an oil separating device of a crankcase ventilation with an impactor separating element according to FIG. 15 with an element arranged at the inlet opening for regulating a pressure drop in a sectional view.
Figure 17:
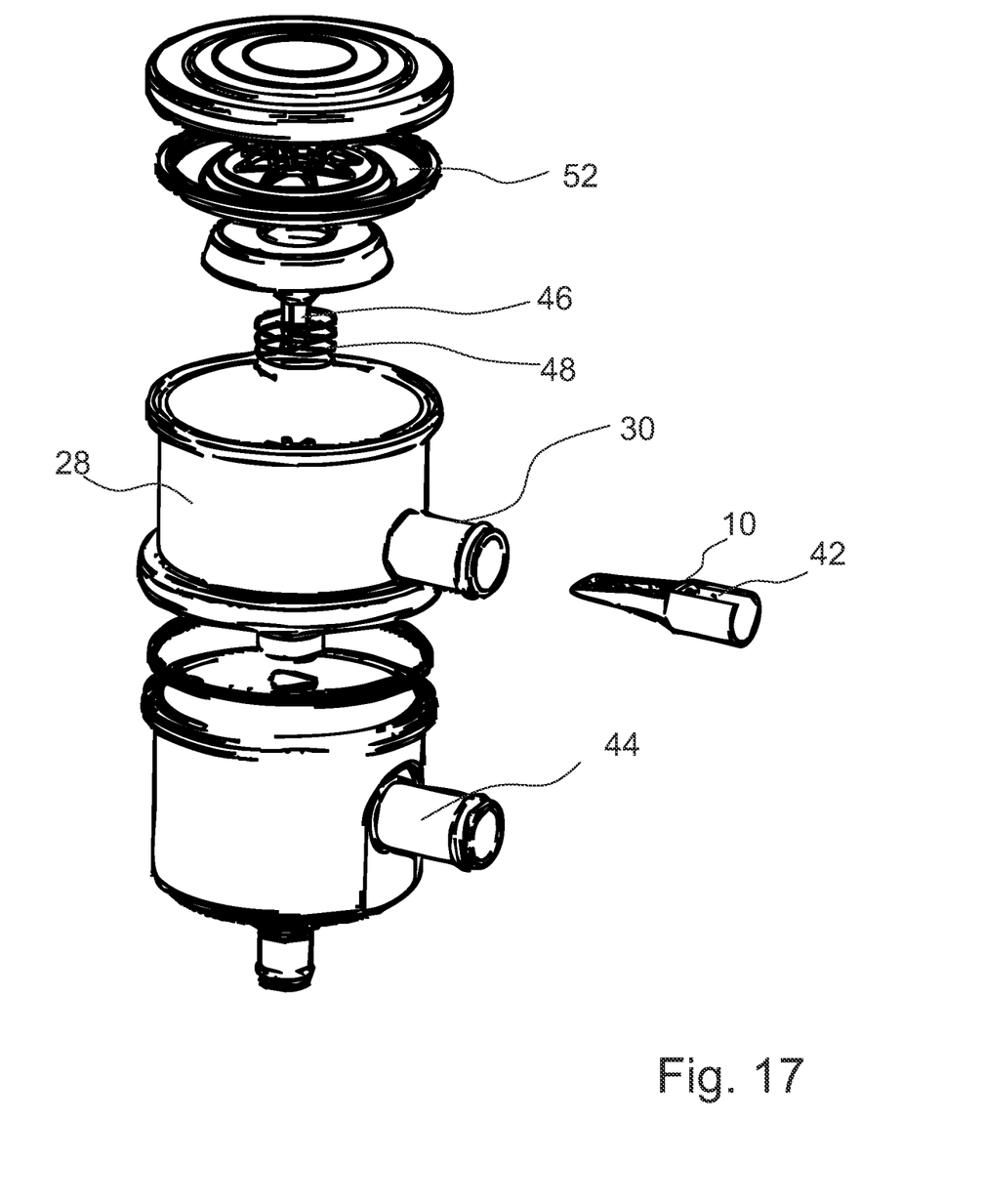
FIG. 17 an exploded view of the oil separator device of FIG. 16.

FIGS. 16 and 17 show an oil separating device of a crankcase ventilation with an impactor-separator element 10 according to FIG. 15 with an element 46 arranged at the inlet opening 26 for regulating a pressure drop in a sectional view or exploded view. The impactor-separator element 10 is inserted into the gas inlet of a housing 28 of the oil separator device, similar to the example in FIG. 5. The gas inlet 30 is connected to the crankshaft housing of an internal combustion engine. The oil separation device regulates a negative pressure in the crankshaft housing to an allowable and desired range. At a gas outlet 44 of the housing 28, which is connected to the intake tract of an internal combustion engine, a negative pressure is applied which draws the gas from the crankshaft housing and which, reduced by a pressure drop at the impactor separator element 10 with the element 46, is transferred to the gas inlet 30 and thus to the crankshaft housing.

In order to avoid an excessively large negative pressure in the crankshaft housing, the pressure drop in the oil separation device must be controlled. For this purpose, the oil separation device comprises a pressure chamber 50 above the impactor separation element 10, which is bounded by a diaphragm 52, is connected to the gas inlet 30 via the opening 42 in the holder 16 and is deflected by a spring 48 in the direction of a housing cover via a support plate formed integrally with the element 46. If the pressure in the crankcase drops, the pressure in the gas inlet 30 and in the pressure chamber 50 also drops, and the diaphragm 52 is deflected against the restoring force 48 of the spring 48 in the direction of the impactor-separator element 10, so that the element 46 also moves downward. The diaphragm 52 and the pressure chamber 50, therefore, form a pressure regulating mechanism designed to reduce the flow cross-section as the pressure differential between the gas inlet and a gas outlet increases.

The element 46 engages the air flow at the inlet of the impactor separator element 10 through the opening 42 and is formed as a flat gate with an opening 46a whose shape and size corresponds to one of the two partial inlet openings 28a, 28b of the inlet opening 28 of the impactor separator element 10 divided by the center wall 40.

Figure 18:
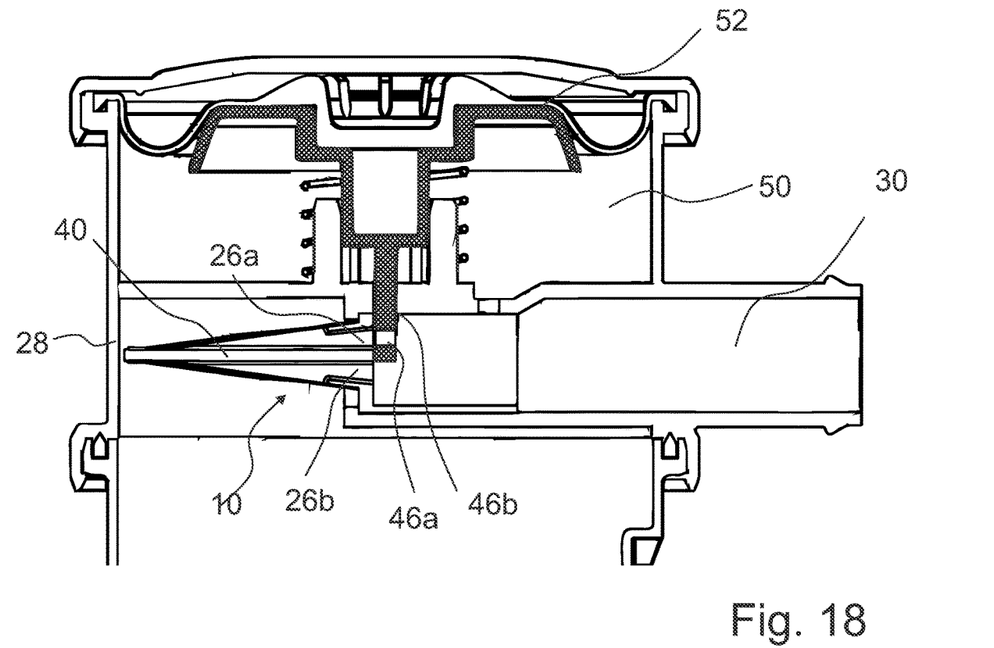
FIG. 18 a detailed view of the oil separator of FIGS. 16 and 17 in a position with uncontrolled pressure drop.

FIG. 18 shows a detailed representation of the oil separator device of FIGS. 16 and 17 in a position with uncontrolled pressure drop, which is assumed when the negative pressure in the pressure chamber 50 is below a minimum pressure determined by the spring force of the spring 48. In this configuration, the openings 46a, 46b are aligned with the partial inlet openings 28a, 28b of the impactor-separator element 10, so that the gas from the gas inlet 30 can flow freely into the impactor-separator element 10.

Figure 19:
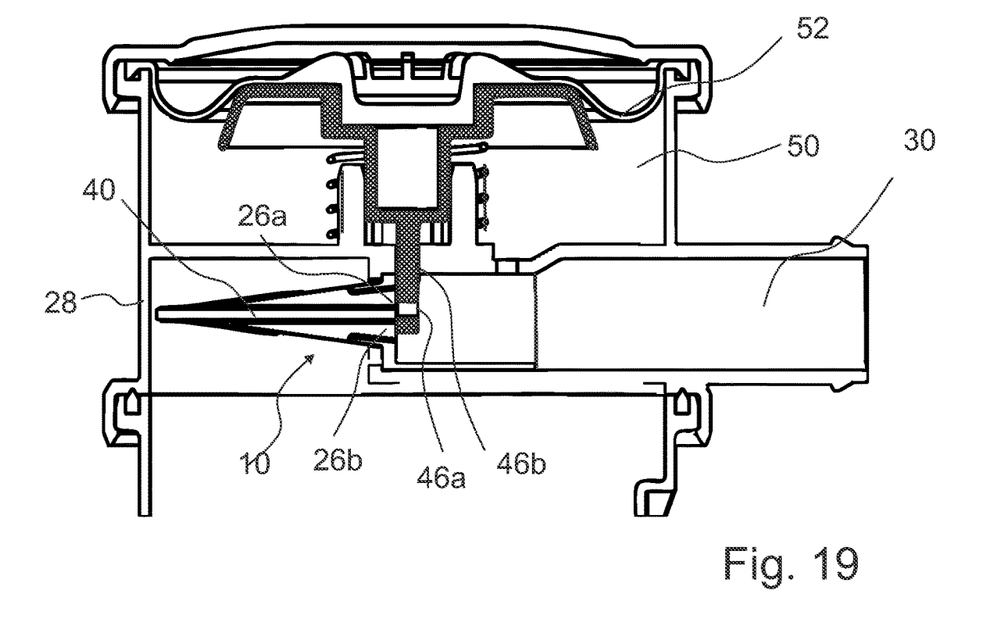
FIG. 19 a detailed view of the oil separator device of FIGS. 16 and 17 in a position with controlled pressure drop.

FIG. 19 shows a detailed view of the oil separation device of FIGS. 16 and 17 in a position with controlled pressure drop, which is assumed when the negative pressure in the pressure chamber 50 exceeds the minimum pressure determined by the spring force of the spring 48. In this configuration, the element 46 partially covers the partial inlet openings 28a, 28b of the impactor-separator element 10, so that the cross-sectional flow area is reduced and the pressure drop at the impactor-separator element 10 increases compared to the configuration in FIG. 18, the greater the negative pressure in the pressure chamber 50.

The arrangement of the element 46 regulating the pressure drop upstream of the inlet of the impactor-separator element 10 has the decisive advantage over the configuration of FIG. 5 that the flow velocity of the gas flowing into the impactor-separator element 10 increases with reduced flow cross section.

Since the efficiency of the impactor-separator element 10 increases with increasing flow velocity, the efficiency increases with increasing differential pressure. The flow energy or increased velocity released by the pressure drop across the element 46 is therefore effectively utilized to increase the efficiency of the impactor-separator element 10.

The skilled person will recognize that the combination of the impactor separator element 10 with an element 46 upstream of it, which reduces the flow cross-section at a higher pressure difference, can be used not only in the context of an oil separation device of a crankcase ventilation system but also in other areas of application in which aerosols have to be separated. In cases where the pressure in the crankcase is not limited by a vacuum but by an overpressure, the control mechanism should be configured in such a way that the flow cross-section decreases with increasing overpressure in the crankcase. Furthermore, the use of this combination is not limited to micro-impactors of a specific type but can be used for all embodiments described above as well as for separator elements of the type described in WO 2018036939 A1.

LIST OF REFERENCE SIGNS

10 Impactor-separator element
12 Fluid droplet
14a, 14b Separator
16 mounting
18 Main flow axis
20 Support frame
22 Wires
24 Droplet
26 Inlet opening
28 Housing
30 Gas inlet
32 Valve
34 Pipeline
36 Flow guide element
38 Spring
40 Center wall
42 Opening
44 Gas outlet
46 Element
48 Spring
50 Pressure chamber
52 Diaphragm

The invention claimed is:

1. An impactor-separator element (10) for separating fluid droplets (12) from a gas stream, comprising:
at least one separator means (14a) having a raw side and a clean side, said separator means (14a) being designed as a mesh or grid element and being fixed in a holder (16), wherein the holder (16) positions the separator means (14a) in the gas stream so that the separator means (14a) is positioned along a plane at an angle between 3 and 40 degrees relative to a direction of inflow of the gas stream at a front end of the separator means; and, a variable element (46) for varying a flow cross-section of the gas flow disposed in the gas stream upstream of the separation means (14a) and controlling the gas stream impinging on the separation means (14a).

2. The impactor-separator element according to claim 1, wherein the element comprises a flow guide element (36) directing the gas flow with a shallow angle of attack to the separator means (14a).

3. The impactor-separator element (10) according to claim 1 wherein the holder (16) is designed to position the separator means (14a, 14b) in the gas flow in such a way that the gas on the clean side of the separator means (14a, 14b) can flow off freely.

4. The impactor-separator element (10) according to claim 1 wherein the support (16) is adapted to mount the separator means (14a, 14b) in a housing (28) and that the support (16) comprises a spacer structure ensuring a minimum distance of at least 2 mm to the housing wall.

5. The impactor-separator element (10) according to claim 4, wherein the spacer structure comprises a base for insertion into a housing opening.

6. The impactor-separator element (10) according to claim 1 wherein at least two separator means (14a, 14b) arranged symmetrically with respect to a main flow axis (18) of the gas flow.

7. The impactor-separator element (10) according to claim 6, wherein said separator means (14a, 14b) form side surfaces of a triangular prism or tent-like structure.

8. The impactor-separator element (10) according to claim 1, wherein the flow guide element (36) is displaceable against a restoring force by the pressure of the gas flow, shields in at least one configuration a partial area of the separator means (14a), and is configured to expose a larger area of the separator means (14a) with increasing displacement.

9. The impactor-separator element (10) according to claim 1, wherein the separator means (14a, 14b) is arranged parallel to a main flow axis (18) of the gas flow.

10. A device comprising a housing (28) and an impactor-separator element (10) arranged at a gas inlet of the housing (28) according to claim 1, wherein a distance of an inner housing wall from the clean side of the separator means (14a, 14b) is such that a free outflow of the gas stream exiting the separator means (14a, 14b) is ensured.

11. The device according to claim 10, wherein an angle between a wall of the housing (28) or the holder (16) adjoining the foot of the separator means (14a, 14b) is at least 60°.

12. The device according to claim 10, wherein a distance between the inner wall of the housing (28) and the clean side of the separator means (14a, 14b) in a direction perpendicular to a main plane of the separator means (14a, 14b) is at least 2 mm, preferably at least 5 mm, in substantially every point of the separator means (14a, 14b).

13. The device according to claim 10, wherein the housing (28) is designed such that the gas flow after passing through the impactor-separator element (10) is deflected to separate fluid droplets (24) deposited by the separator element on a housing wall.

14. The device according to claim 10, wherein the housing (28) comprises a pressure regulating mechanism adapted to reduce the flow cross-section as the pressure difference between the gas inlet and a gas outlet increases.

15. The device according to claim 10, wherein the device is employed as a separator element in the gas flow of a side channel compressor of an internal combustion engine.

16. The device according to claim 1, wherein the angle is 8 degrees.

* * * * *